(12) United States Patent
Reinsch

(10) Patent No.: US 12,077,040 B2
(45) Date of Patent: Sep. 3, 2024

(54) METHOD FOR PRODUCING A DRIVE CABLE HOLDER FOR A VEHICLE ROOF AND COMPONENT FOR A VEHICLE ROOF

(71) Applicant: Webasto SE, Stockdorf (DE)

(72) Inventor: Burkhard Reinsch, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 899 days.

(21) Appl. No.: 16/969,731

(22) PCT Filed: Apr. 18, 2019

(86) PCT No.: PCT/EP2019/060113
§ 371 (c)(1),
(2) Date: Aug. 13, 2020

(87) PCT Pub. No.: WO2019/206812
PCT Pub. Date: Oct. 31, 2019

(65) Prior Publication Data
US 2021/0001698 A1   Jan. 7, 2021

(30) Foreign Application Priority Data
Apr. 26, 2018   (DE) ..................... 10 2018 110 124.4

(51) Int. Cl.
*B60J 7/05* (2006.01)
*B29C 44/12* (2006.01)
(Continued)

(52) U.S. Cl.
CPC ......... *B60J 7/0573* (2013.01); *B29C 44/1266* (2013.01); *B62D 65/14* (2013.01);
(Continued)

(58) Field of Classification Search
CPC ........ B60J 7/057; B60J 7/0573; B60J 7/0576; B60J 7/22; B62D 65/02; E05Y 2900/542;
(Continued)

(56) References Cited

U.S. PATENT DOCUMENTS 8,231,170 B2 * 7/2012 Katayama .............. B60J 7/0573
296/223
2003/0047968 A1   3/2003 Imgram et al.
(Continued)

FOREIGN PATENT DOCUMENTS

CN         104228529 A    12/2014
DE         10039522 A1    2/2002
(Continued)

OTHER PUBLICATIONS

Leroy et al., "Motor vehicle roof, has body shell with cross beam having retainer at its top side, where drive for mobile body unit is arranged in retainer, and drive is covered by roof body shell", Published: Apr. 20, 2006, Publisher: German Patent Office, Edition: DE-102004050107-A1 (Year: 2006).*

(Continued)

*Primary Examiner* — Joseph D. Pape
(74) *Attorney, Agent, or Firm* — Fitch, Even, Tabin & Flannery, LLP

(57) ABSTRACT

A method for producing a drive cable holder for a vehicle roof, which may have the steps of providing a component for the vehicle roof; positioning the component in a moulding tool; providing a guide tube for a drive cable; positioning the guide tube in the moulding tool; introducing a plastic into the moulding tool such that the plastic completely radially surrounds the drive cable at least in sections and such that the plastic comes into contact with a surface of the component; and thereby forming the drive cable holder which is secured to the component.

6 Claims, 3 Drawing Sheets

Figure 1:
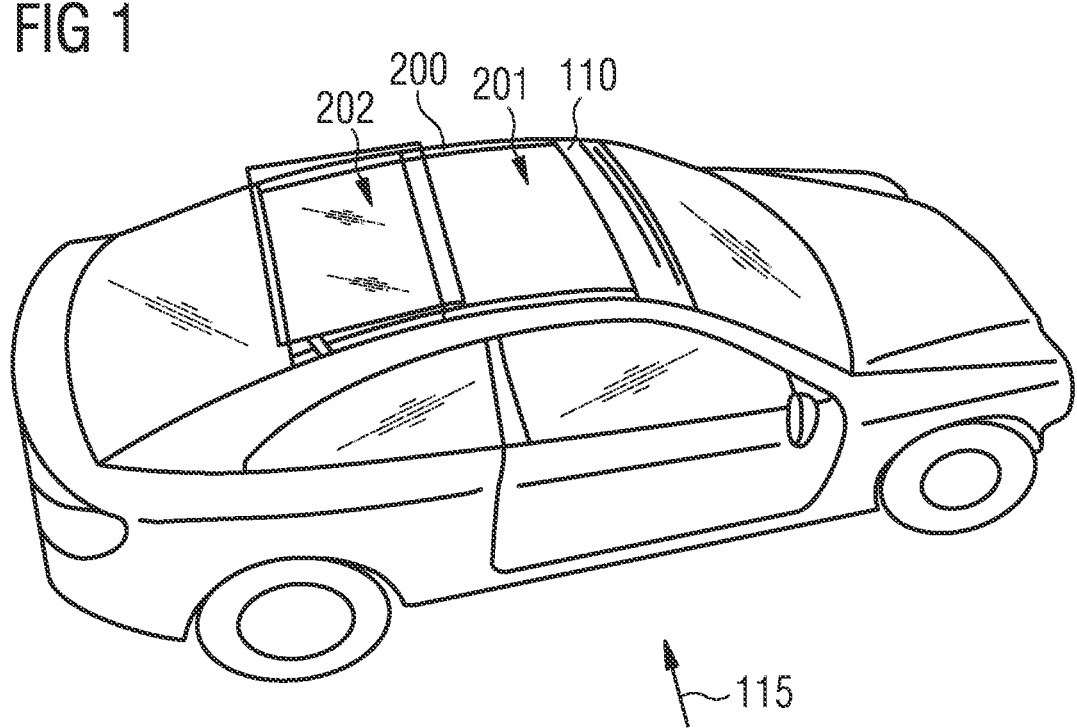

(51) Int. Cl.
  *B60J 7/057* (2006.01)
  *B62D 65/14* (2006.01)
  *B29C 67/24* (2006.01)
  *B29K 75/00* (2006.01)
  *B29K 105/04* (2006.01)
  *B29L 31/30* (2006.01)
  *B29L 31/34* (2006.01)

(52) U.S. Cl.
  CPC ........ *B29C 67/246* (2013.01); *B29K 2075/00* (2013.01); *B29K 2105/04* (2013.01); *B29L 2031/3011* (2013.01); *B29L 2031/3462* (2013.01)

(58) Field of Classification Search
  CPC .......... H02G 3/00; H02G 3/04; H02G 3/0462; H02G 3/0481
  USPC ............................................ 296/216.06, 223
  See application file for complete search history.

(56) References Cited

U.S. PATENT DOCUMENTS

| | | |
|---|---|---|
| 2003/0085595 A1 | 5/2003 | Dunzinger et al. |
| 2004/0169400 A1 | 9/2004 | Joachim |
| 2014/0360295 A1 | 12/2014 | Heidan et al. |

FOREIGN PATENT DOCUMENTS

| | | | |
|---|---|---|---|
| DE | 101 44 742 A1 | 3/2003 | |
| DE | 10308582 A1 | 9/2004 | |
| DE | 102004050107 A1 * | 4/2006 | ............ B60J 7/0573 |
| DE | 201 228 31 U1 | 6/2008 | |
| DE | 20122834 U1 * | 7/2008 | ............ B05C 5/001 |
| DE | 10 2015 119405 A1 | 5/2017 | |

OTHER PUBLICATIONS

Webasto AG, "An Openable Vehicle Roof With Drive Cables", Published: Jul. 17, 2008, Publisher: German Patent Office, Edition: DE20122834U1 (Year: 2008).*
EPO; Application No. 19720506.5; Examination Report dated Mar. 23, 2023. (in German with machine translation); (14 pages).
Kleiven Svein; "A parametric study of energy absorbing foams for head injury prevention", Research Gate, Jan. 31, 2007; XP093023098; https://www.researchgate.net/publication/; (13 Pages in English).
EPO; Application No. 19720506.5; Examination Report dated Dec. 2, 2021. (in German with machine translation).
International Search Report for PCT/EP2019/060113 mailed Jul. 29, 2019 in English and German (4 pages).
Chinese Office Action from related Chinese Application No. 201980022112.8; dated Feb. 20, 2023 with English Translation (22 Pages).
Chinese Office Action from related Chinese Application No. 201980022112.8; dated Oct. 31, 2023 with English Translation (16 Pages).

* cited by examiner

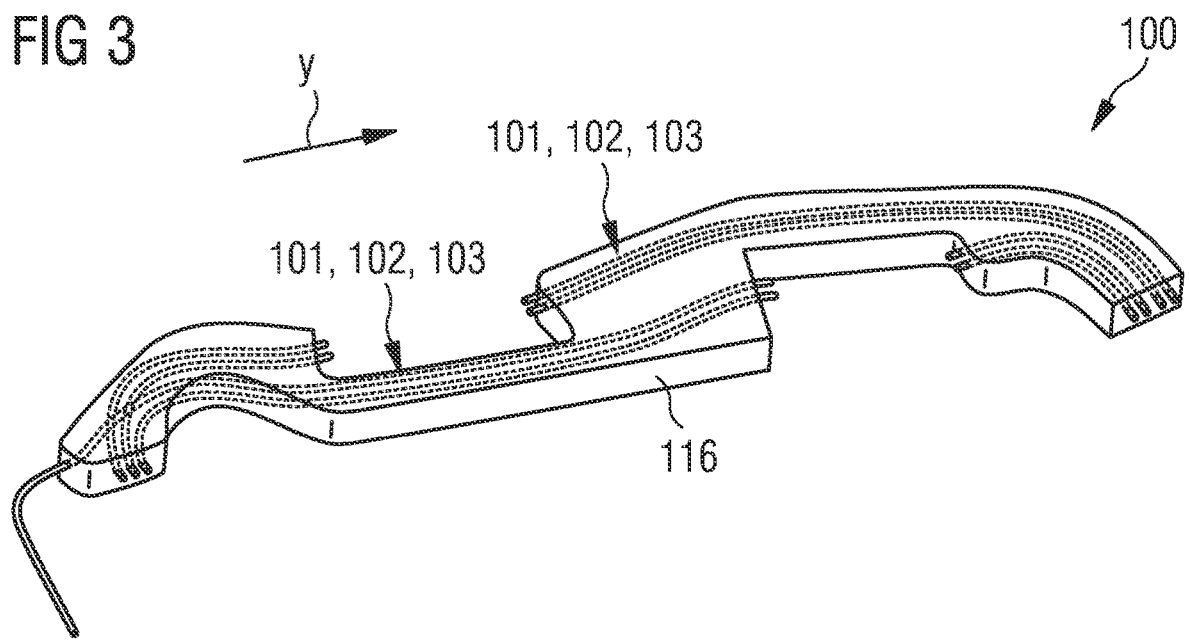
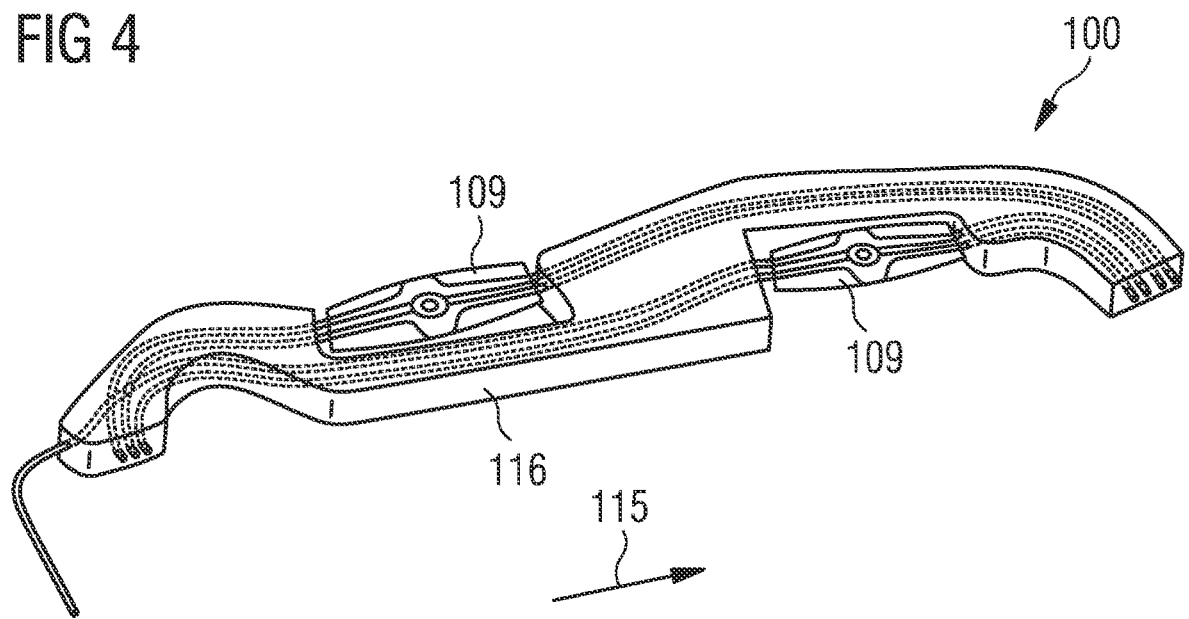

METHOD FOR PRODUCING A DRIVE CABLE HOLDER FOR A VEHICLE ROOF AND COMPONENT FOR A VEHICLE ROOF

CROSS-REFERENCE TO RELATED APPLICATIONS

This application is a U.S. national phase application filed under 35 U.S.C. § 371 of International Application No. PCT/EP2019/060113, filed 18 Apr. 2019, designating the United States, which claims priority from German Patent Application No. 10 2018 110 124.4, filed 26 Apr. 2018, which are hereby incorporated herein by reference in their entirety for all purposes.

A method for producing a drive cable holder for a vehicle roof is specified. Moreover, a component for a vehicle roof that has a drive cable holder is specified.

FIELD

A motor vehicle can have a roof opening that can be closed by means of a movable cover and can be at least partially exposed. By way of example, the movement of the cover is driven by means of a drive, which is coupled to the cover by means of a drive cable. It is also possible to provide a roller blind in a motor vehicle that can be moved by means of a drive and of a drive cable. The drive cable is guided in a guide tube, for example, as described in DE 101 44 742 A1.

BACKGROUND

It is desirable to specify a method for producing a drive cable holder for a vehicle roof which comprises simple production with a good degree of integration. It is furthermore desirable to specify a component for a vehicle roof which has a drive cable holder, wherein the component can be produced at low cost and in a relatively simple manner.

SUMMARY

According to at least one embodiment, a method for producing a drive cable holder for a vehicle roof comprises providing a component for the vehicle roof. The component is positioned in a mold. A guide tube for a drive cable is provided. The guide tube is positioned in a mold. In particular, the guide tube and the component are positioned relative to one another and relative to the mold, thus ensuring that predetermined positions are achieved. A plastic is introduced into the mold. The plastic completely surrounds the drive cable radially in the mold, at least in some section or sections. In the mold, the plastic comes into contact with a surface of the component. The drive cable holder is thereby formed and secured on the component. In particular, the drive cable holder is formed after the plastic has cured.

The method allows direct attachment of the guide tube to the component. It is possible to dispense with further fastening elements, such as rivets or screws or adhesive joints. Moreover, a small number of method steps is sufficient. In comparison with conventional production methods, in which the guide tube is secured retrospectively in plastic parts produced by injection molding, method steps and thus costs are eliminated. Moreover, there is no need for any aids that are conventionally required for the insertion of the tubes into the plastic part. The drive cable holder furthermore takes up less space than conventional plastic parts. Moreover, the drive cable holder has a relatively small installation space requirement. It is thus possible to increase visibility in the case of a transparent vehicle roof, for example.

According to at least one embodiment, a holding element for holding the guide tube in the mold is provided. The holding element is removed after the introduction of the plastic. A free access to the guide tube at a position of the drive cable holder corresponding to the holding element is thereby formed. Holding the guide tube in the mold is required only in short sections, in which the holding elements are arranged. Between the holding elements, the guide tube is freely accessible in the mold. Consequently, it is possible for the guide tube to be completely surrounded radially by the plastic in the regions outside the holding elements. At the holding elements, the guide tube is not completely, but only partially, surrounded by the plastic. Thus, the free access remains, but this has no negative effects on the stability of the drive cable holder.

According to at least one embodiment, a mounting for a drive is provided. The mounting is positioned in the mold before the introduction of the plastic. The plastic is introduced into the mold, with the result that the plastic holds the mounting when the drive cable holder is formed. In particular, the mounting is positioned relative to the component and the guide tube at a predetermined position at which the drive is supposed to be mounted in the finished drive cable holder. The drive is an electric drive, for example, and, for example, has an electric motor. In the state ready for operation, the electric motor is, in particular, in contact in such a way with a drive cable that is guided in the guide tube that the drive can move the guide cable along the guide tube.

According to at least one embodiment, a materially bonded connection is formed between the plastic and the component for securing the drive cable holder on the component. In particular, the plastic is introduced into the mold in such a way that the materially bonded connection is formed. It is thus possible to dispense with further mechanical connections for holding the drive cable holder on the component.

According to at least one embodiment, a plurality of guide tubes is provided, which are each designed to guide a drive cable. The plurality of guide tubes is positioned in the mold at least partially in different planes. The planes are spaced apart parallel to a main direction of extent of the guide tubes. In particular, the guide tubes are arranged vertically relative to one another in the different planes in the state ready for operation. Thus, a small installation space requirement for the drive cable holder can be achieved. Moreover, close spacing of the guide tubes relative to one another can be achieved.

According to at least one embodiment, the guide tubes are positioned at least partially in overlap in the mold. Crossing and arrangement one above the other of the guide tubes is thus possible. A small installation space requirement of the drive cable holder is thereby achieved.

According to at least one embodiment, the drive cable is provided. The drive cable is inserted into the guide tube after the formation of the drive cable holder. It is possible first of all to form on the component the drive cable holder, which has the guide tube or a plurality of guide tubes. Subsequently, the drive cable or a plurality of drive cables can simply be inserted into the guide tubes.

According to at least one embodiment, the formation of the drive cable holder comprises a foaming method. In particular, the plastic is foamed against the mold. The plastic is a polyurethane, for example. The guide tube is surrounded by plastic foam in the mold. A "RIM" method (reaction injection molding) or some other low-pressure method is used, for example. By way of example, two different components, e.g. isocyanate and polyol, are introduced in liquid form into a countercurrent mixing head, homogenized and introduced into the mold at a low pressure of up to no more than 6 bar, for example. There, the components react to form polyurethane. Owing to the low pressure that is used in the foaming method, the guide tube is not deformed. The guide tube is a plastic tube, for example. It is thus possible to use a flexurally elastic, relatively thin-walled guide tube. The low internal pressures in the mold avoid yielding and deformation of the guide tube during the formation of the drive cable holder.

According to at least one embodiment, a component for a vehicle roof has a drive cable holder. By way of example, the component with the drive cable holder is produced according to a production method described here. The drive cable holder has a holding body composed of a plastic. The drive cable holder has a guide tube. The guide tube is completely surrounded radially by the holding body, at least in some section or sections. The holding body is formed integrally and is connected in a materially bonded manner to the component. By way of example, the holding body is formed from a foamed plastic, such as polyurethane.

The features and advantages explained in relation to the method also apply to the component and vice versa.

The component with the directly foamed-on holding body makes possible a relatively small installation space requirement and, at the same time, reliable support of the guide tube. Moreover, flexible configuration of the position of the guide tube relative to the component is possible. No further fastening elements are required to secure the drive cable holder on the component. A high degree of integration can therefore be achieved.

According to at least one embodiment, the component has a mounting for a drive, which is held by a holding body. An interface for the mounting of the drive is thus also integrated into the drive cable holder.

According to at least one embodiment, the holding body is of such flexible design that the drive cable holder has a head injury factor of less than 1500. Particularly through the use of a PUR foam, it is possible to form the holding body with an elastic, energy-absorbing strength, and therefore the holding body composed of the plastic foam is designed as an absorber. The head injury factor of less than 1500 in the vehicle roof region can thus be achieved. The head injury factor (HIC, head injury criterion) is stipulated by law, for example. It is possible, by means of the holding body composed of foamed plastic, to enable a head injury factor of less than 1000, for example. The drive cable holder thus serves both to hold the guide tube and, where applicable, the drive and as an absorber for enabling the required head injury factor in the vehicle roof region. Thus, otherwise necessary additional absorber components can be omitted, thereby making it possible to reduce assembly costs and component costs. Moreover, a high degree of integration can be achieved.

According to at least one embodiment, the component has a plurality of guide tubes. The guide tubes are arranged in the drive cable holder at least partially in different planes. The planes are each spaced apart parallel to a main direction of extent of the guide tubes. In the normal operating position, arrangement of the guide tubes in a manner spaced apart vertically and horizontally is thus possible. The guide tubes at least partially overlap and/or cross one another, for example. It is thus possible to save installation space.

According to at least one embodiment, the component is a frame element for a roof opening of the vehicle roof. In particular, the component is the frame element which is arranged along the windscreen, transversely to the main direction of travel of the vehicle.

BRIEF DESCRIPTIONS OF THE DRAWINGS

Figure 2:
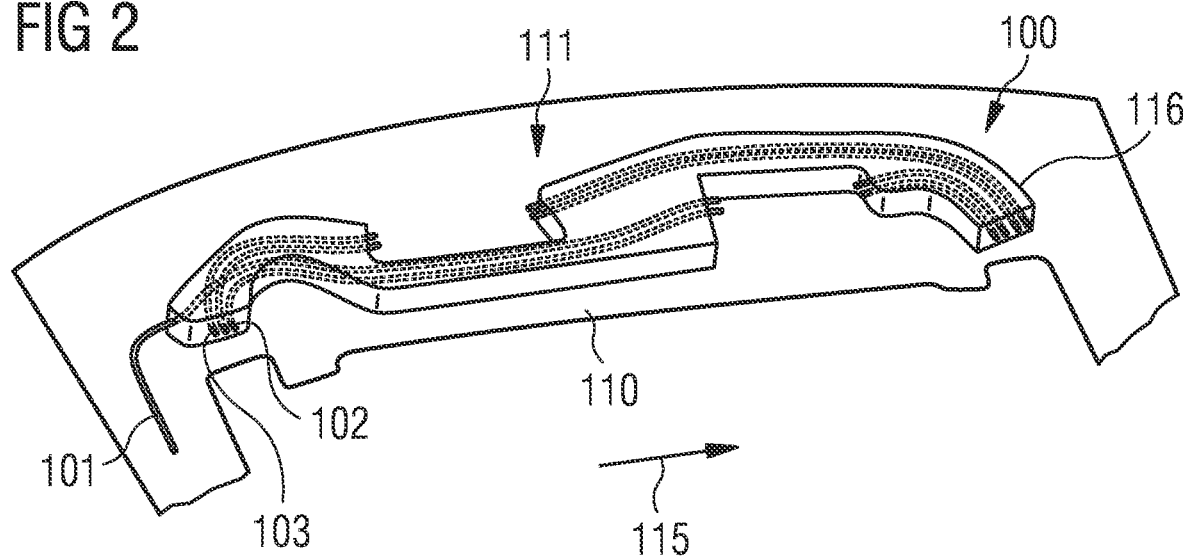
Figure 5:
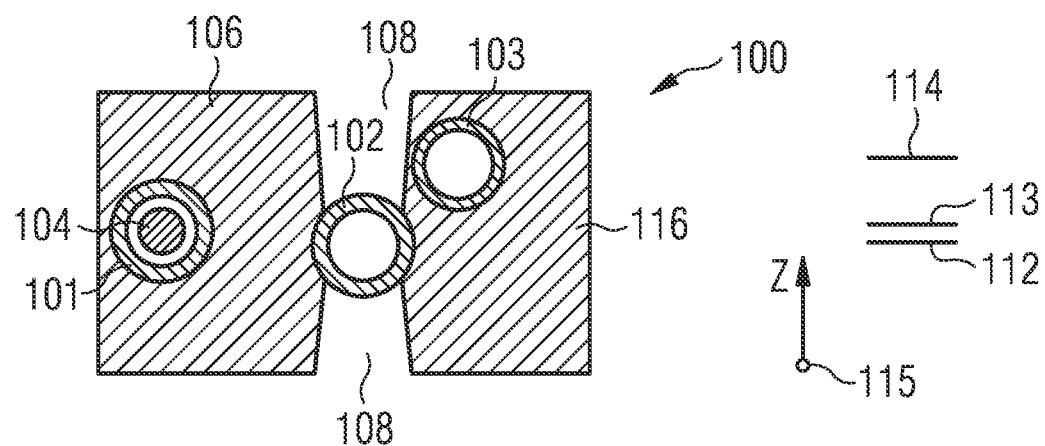
Figure 6:
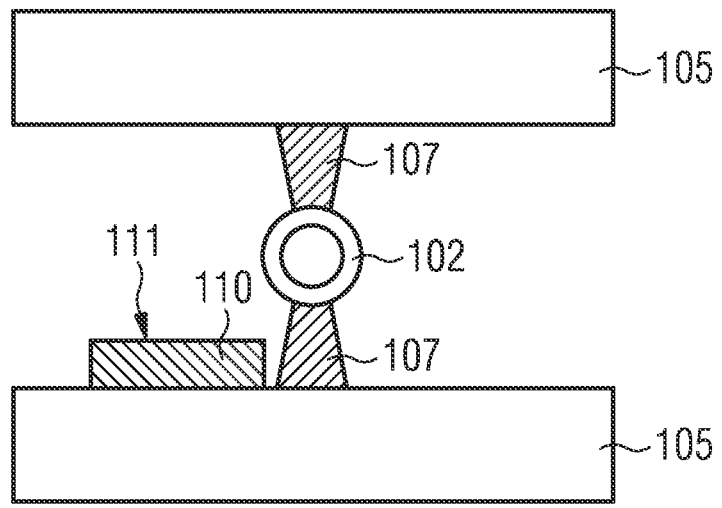

Further advantages, features and developments will become apparent from the following illustrative embodiments explained in conjunction with the figures. Elements that are identical, are of the same type or act in the same way may be provided with the same reference signs throughout the figures. In the drawings:

FIG. 1 shows a schematic illustration of a motor vehicle according to one illustrative embodiment, FIG. 2 shows a schematic illustration of a component according to one illustrative embodiment, FIG. 3 shows a schematic illustration of a drive cable holder according to one illustrative embodiment, FIG. 4 shows a schematic illustration of a drive cable holder according to one illustrative embodiment, FIG. 5 shows a schematic illustration of a cross section through a drive cable holder according to one illustrative embodiment, and FIG. 6 shows a schematic illustration of production according to one illustrative embodiment.

DETAILED DESCRIPTION

FIG. 1 shows a motor vehicle having a vehicle roof 200. The vehicle roof has a roof opening 201, which can be closed by means of a cover 202. According to the illustrative embodiment, the cover 202 can be moved relative to the remainder of the vehicle roof 200, e.g. in the manner of a sliding roof. According to other embodiments, the cover 202 is what is referred to as a fixed roof element, which is coupled to the motor vehicle in such a way as to be immovable relative to the remainder of the vehicle roof 200.

Arranged on the roof opening 201 is a component 110, which, in particular, is a frame element. The frame with the component 110 is used to guide and hold the cover 202, for example. Alternatively or in addition, the frame with the component 110 is used to guide and hold a roller blind (not shown explicitly).

FIG. 2 shows the component 110 according to one illustrative embodiment. The component 110 has a drive cable holder 100. The drive cable holder 100 is foamed directly onto a surface 111 of the component 110. The drive cable holder 100 has a holding body 116 composed of plastic. The holding body 116 is formed from polyurethane, for example. The holding body 116 is connected in a materially bonded manner to the component 110.

The drive cable holder 100 has guide tubes 101, 102, 103. The guide tubes 101, 102, 103 are each designed to guide a drive cable 104 (FIG. 5). According to further illustrative embodiments, a larger or smaller number of guide tubes is provided.

The guide tubes 101, 102, 103 are each plastic tubes, for example. The guide tubes 101, 102, 103 are connected in a materially bonded manner to the holding body 116. The holding body 116 surrounds the guide tubes 101, 102, 103 completely in some section or sections in order to hold the guide tubes 101, 102, 103. Particularly transversely to a main direction of extent 115, the guide tubes 101, 102, 103 are each completely surrounded radially in some section or sections by the holding body 116.

In particular, the holding body 116 is formed from a foamed plastic 106 (FIG. 5). It is thus possible to dispense with plastic parts produced by injection molding. Owing to the fact that the guide tubes 101, 102, 103 are secured directly in the foamed plastic 106 of the holding body 116, the guide tubes 101, 102, 103 are held without having to be inserted into the holding body 116 subsequently. It is thus possible to dispense with construction aids for the subsequent insertion of the guide tubes. Thus, it is possible to achieve a smaller installation space requirement, and production and assembly involve less effort overall and are therefore more efficient.

The installation space required for the component 110 and the drive cable holder 100 is reduced. Thus, visibility in the case of a transparent cover 202 is increased. The area occupied by the component 110 within the roof opening 201 is reduced.

The guide tubes 101, 102, 103 can be arranged offset transversely to the main direction of extent 115 (FIG. 5). Moreover, it is possible to arrange the guide tubes 101, 102, 103 at a short distance from one another, in overlap and/or crossing over one another. It is thus possible to arrange a multiplicity of guide tubes 101, 102, 103 close together and one above the other and, at the same time, to achieve flexible scope for design. Here, the holding body 116 provides adequate support to the guide tubes 101, 102, 103 after the curing of the plastic 106, and therefore reliable guidance of the drive cables 104 is possible in operation. Tensile and/or compressive forces are reliably supported.

In particular, the holding body 116 is not produced by means of an injection molding method, in which relatively high internal pressures prevail in the mold. The relatively high internal pressures would lead to the relatively thin-walled guide tubes 101, 102, 103 yielding and being deformed. The holding body 116 is produced by means of a foaming method, in which relatively low pressures of up to no more than 6 bar prevail in a mold 105 (FIG. 6). During the foaming of the components in the mold 105, the plastic 106 spreads out in such a way that it surrounds the guide tubes 101, 102, 103 to a sufficient extent to hold said tubes. In this case, it is also possible to arrange three, four or more tubes one above the other with a small spacing since the plastic can also surround such geometries by means of the foaming. All that is required is for the guide tubes 101, 102, 103 to be held at a small number of points in the mold 105 during the foaming process. In the remaining regions, the plastic 106 completely surrounds the guide tubes 101, 102, 103 radially after curing.

It is thus possible, with a relatively low processing pressure, to enclose thin-walled guide tubes 101, 102, 103 lying one above the other over the entire surface and to connect them to one another. By virtue of the fact that they are surrounded by the plastic 106 over almost the entire surface, the guide tubes 101, 102, 103 are prevented from buckling under load. It is possible to achieve a relatively very small installation space requirement for a plurality of guide tubes 101, 102, 103 lying close together and/or one above the other.

FIG. 3 shows the drive cable holder 100 as an independent component element. In FIG. 3, the drive cable holder 100 is illustrated without the component 110. By way of example, the drive cable holder 100 is produced as a separate component in the mold 105 and only subsequently secured on the component 110. For this purpose, corresponding fastening tabs are provided on the drive cable holder 100 and, in particular, on the holding body 116.

FIG. 4 shows the drive cable holder 100 according to another illustrative embodiment. The drive cable holder 100 has mountings 109. The mountings 109 are used, in particular, for securing a drive or a plurality of drives on the drive cable holder 100. The mountings 109 are connected, in particular in a materially bonded manner, to the holding body 116. It is thus possible, for example, to mold the drive cable holder 100, with the mounting 109 and the guide tubes 101, 102, 103, directly to the component 110.

In particular, the drive is an electric drive and, for example, has an electric motor. In the state ready for operation, the electric motor is in engagement with the drive cable 104, thus enabling the drive to move the drive cables 104 relative to the corresponding guide tube 101, 102, 103 along the main direction of extent 115.

FIG. 5 shows a cross section transversely to the main direction of extent 115 of the drive cable holder 100 according to one illustrative embodiment. The guide tubes 101, 102, 103 are arranged offset relative to one another along a Z direction. By way of example, the Z direction is arranged transversely to the main direction of extent 115 and, in the normal operating position, corresponds to the vertical. By way of example, some section or sections of the guide tube 102 in the illustrative embodiment is/are arranged in a plane 112 in the normal operating position closest to the bottom. At least some section or sections of guide tube 101 is/are arranged in a plane 113 which is at a distance from plane 112 along the Z direction. At least some section or sections of guide tube 103 is/are arranged in a plane 114 which is at a distance from plane 113 and from plane 112 along the Z direction.

In the mold 105, the guide tubes 101, 102, 103 are each held at certain points by holding elements 107 (FIG. 6). In the finished holding body 116, free accesses 108 to the guide tubes 101, 102, 103 are formed at the points which correspond to the positions of the holding elements 107. However, these are formed in only a small proportion of the guide tubes 101, 102, 103, and therefore sufficient support of the guide tubes 101, 102, 103 is provided by the holding body 116.

According to illustrative embodiments, inserts composed, for example, of metal or other rigid materials can be foamed into the holding body 116 at the same time. Thus, for example, stabilization of the holding body 116 is possible. Moreover, it is possible, by means of the inserts, to achieve a necessary pressure resistance and creep resistance at predetermined points.

The holding body 116, especially when composed of the plastic foam, is of such flexible and energy-absorbing design that the foam body of the holding body 116 is effective as an absorber for the achievement of predetermined head impact values (HIC) in the region of the vehicle roof 200 and especially in the region of the component 201. Thus, the otherwise necessary additional absorber components can be omitted, thereby making it possible to avoid additional component costs and assembly costs.

FIG. 6 shows a schematic illustration of the mold 105 according to one illustrative embodiment. The component 110 is inserted into the mold 105 together with the guide tube 102 and optionally further guide tubes. The guide tube 102 is held in a predetermined position relative to the component 110 by the holding elements 107. The inner walls of the mold 105 have the shape which the holding body 116 is subsequently supposed to have. According to further embodiments, further elements, such as inserts and/or the mounting 109 or a plurality of mountings 109, are inserted into the mold 105. The plastic to be foamed, which is composed of a plurality of components for example, is then introduced into the mold 105. In particular, the plastic 106 is introduced into the mold 105 at a slight pressure of less than 10 bar, in particular less at a pressure of between 1 bar and 6 bar. There, the components react and foam to form polyurethane. During this process, the plastic 106 expands in such a way that it surrounds the guide tube 102 and forms the materially bonded connection with the component 110, in particular at the surface 111.

It is thus possible, with a relatively low processing pressure, to enclose thin-walled guide tubes 101, 102, 103 lying one above the other over the entire surface and to connect them to one another. By means of the direct foaming of the drive cable holder 100 on the component 110, low cost production and a high degree of integration are made possible.

The invention claimed is:

1. A component for a vehicle roof, comprising a vehicle roof component having a drive cable holder which has a holding body composed of a plastic and a guide tube, wherein the guide tube is completely surrounded radially by the holding body, at least in some section or sections, and the holding body is formed integrally and is connected in a materially bonded manner to the vehicle roof component, wherein the holding body comprises free accesses to the guide tube.

2. The component according to claim 1, having a mounting for a drive, which is held by the holding body.

3. The component according to claim 1, having a plurality of guide tubes, wherein the guide tubes are arranged in the drive cable holder at least partially in different planes, which are each spaced apart parallel to a main direction of extent of the guide tubes.

4. The component according to claim 3, in which the guide tubes are arranged at least partially in overlap in the drive cable holder.

5. The component according to claim 1, which is a frame element for a roof opening of the vehicle roof.

6. A component for a vehicle roof, comprising a vehicle roof component having a drive cable holder which has a holding body composed of a plastic and a guide tube, wherein the guide tube is completely surrounded radially by the holding body, at least in some section or sections, and the holding body is formed integrally and is connected in a materially bonded manner to the vehicle roof component,
   wherein the guide tube has a plurality of guide tubes,
   wherein the guide tubes are arranged in the drive cable holder at least partially in different planes, which are each spaced apart parallel to a main direction of extent of the guide tubes, and
   wherein the guide tubes are arranged at least partially in overlap in the drive cable holder.

* * * * *